United States Patent Office 2,911,524
Patented Nov. 3, 1959

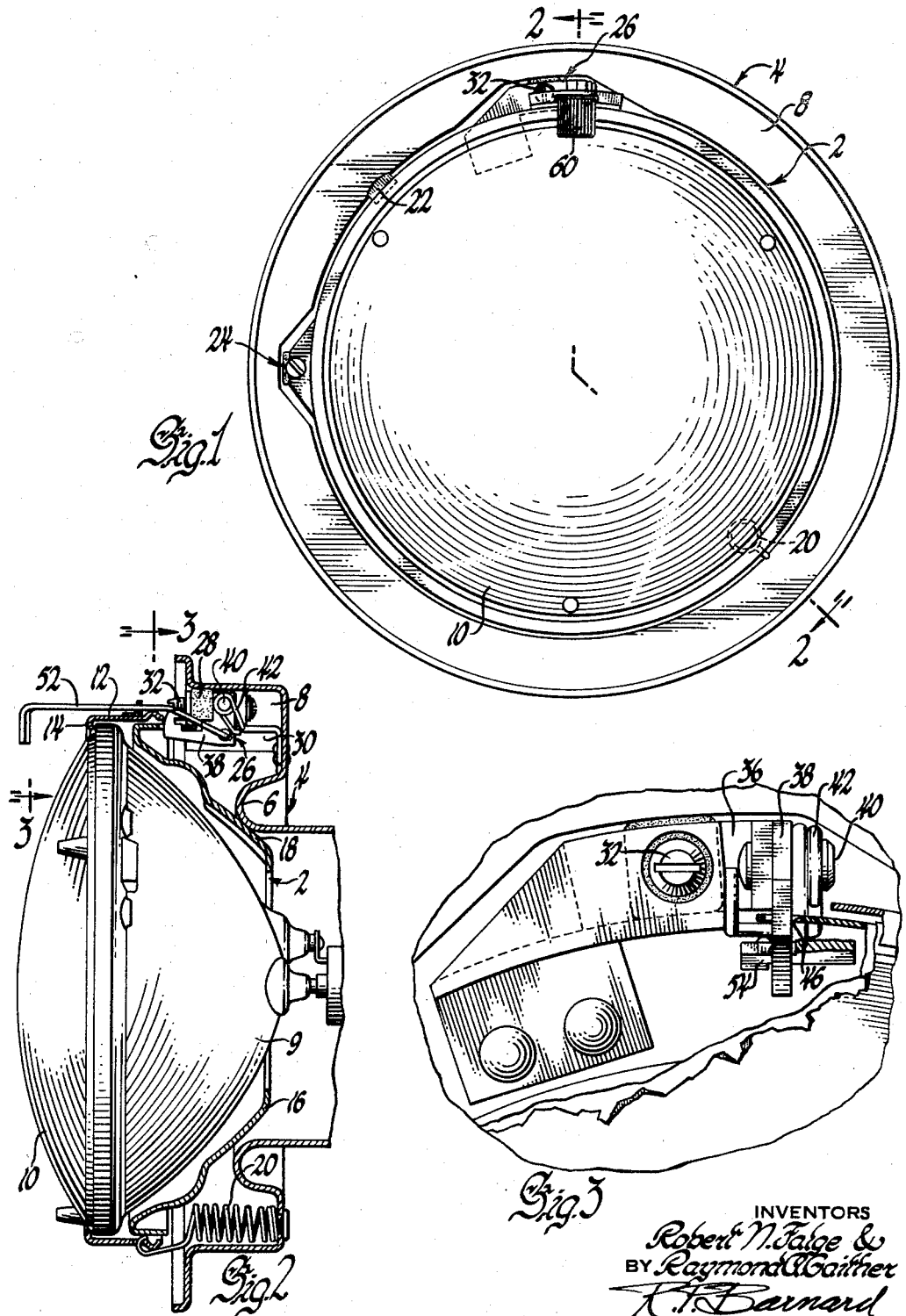

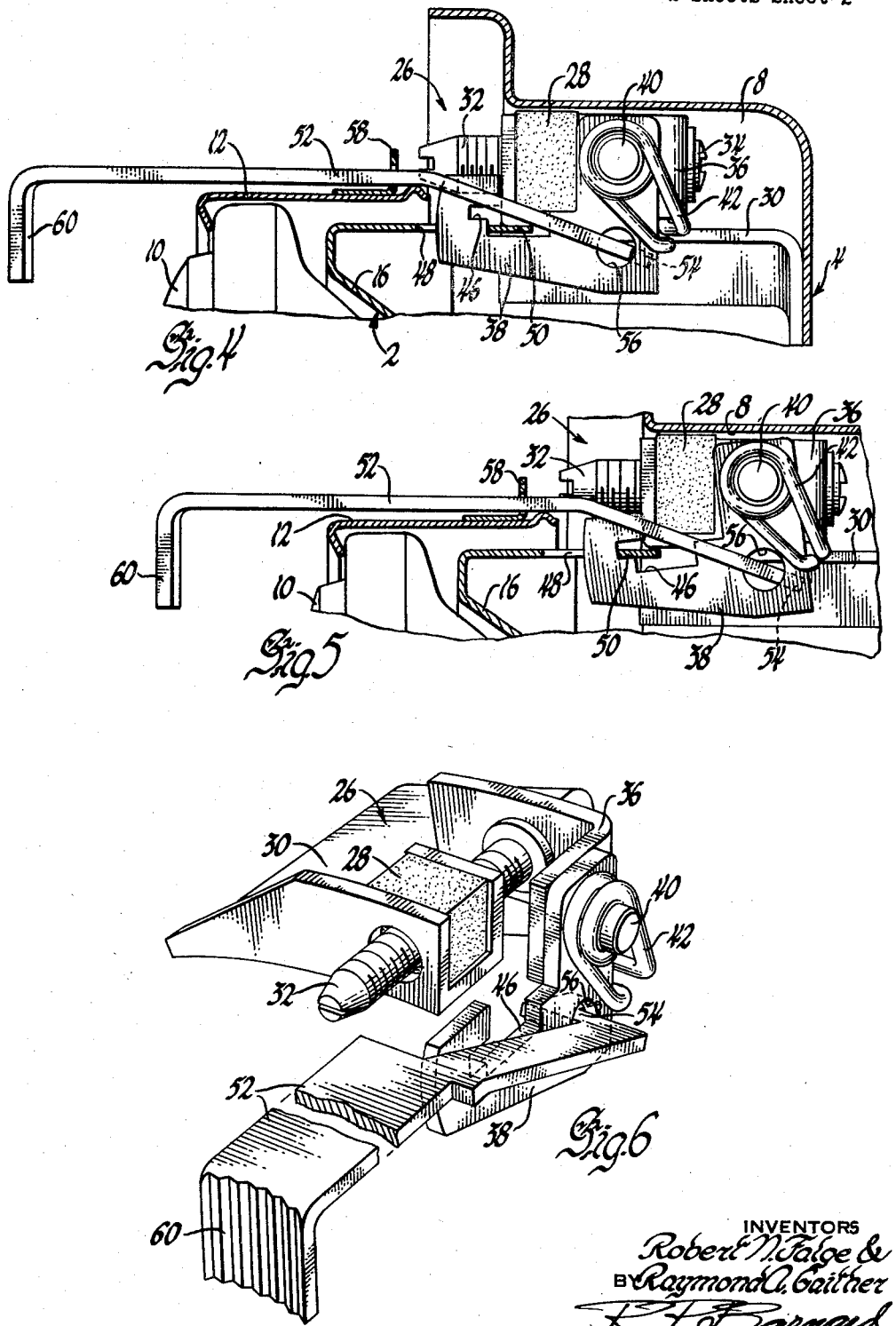

2,911,524

HEADLAMP ADJUSTER

Robert N. Falge, Anderson, and Raymond A. Gaither, Pendleton, Ind., assignors to General Motors Corporation, Detroit, Mich., a corporation of Delaware Application May 13, 1957, Serial No. 658,858

8 Claims. (Cl. 240—41.6)

The present invention relates to an adjusting or aiming mechansim for a headlamp assembly commonly known as the ball and socket type. More specifically, the present invention relates to primary and secondary adjusting or aiming means for the beam of such an assembly, the secondary aiming or adjusting means being operative to aim the headlamp beam to a predetermined fixed extent irrespective of the adjusted position of the primary means and without disturbing the latter's adjustment.

Almost all, if not all, major manufacturers of headlamp assemblies now utilize what may be termed a ball and socket mounting. Such an assembly and mounting is typically depicted in the patent to Howard C. Mead and Robert D. Winkelmeyer No. 2,266,329. Such mountings typically include a ball member universally adjustably mounted in a socket member formed on a supporting housing located within a vehicle fender. The ball member forms a sub-assembly usually including a sealed beam headlamp unit operatively clamped between a retaining ring and a mounting ring, the latter being in adjustable universal bearing engagement with the socket member. The ball member includes a sealed lens, reflector and light unit fixedly mounted within the unit relative to the reflector. Thus, the aforementioned various components of the sealed beam unit are at all times in a fixed relation relative to each other thereby facilitating the design of the lens to provide optimum beam patterns.

As taught in this art, spring means and aiming screws are circumferentially spaced about the assembly and operatively interconnected between the ball and socket members for adjustably mounting the ball member within the socket member. It is usual practice to provide at least two aiming screws mounted respectively on the horizontal and vertical axis of the assembly for cooperation with the spring means for universally adjusting the ball member.

A serious problem has developed with the use of these and other headlamp assemblies with heavy vehicles, particularly those including a tractor drawing a semi-trailer. For example, the aiming screws may be adjusted to provide the desired headlamp aim according to State established standards, but thereafter this aim may be seriously disrupted by loading of the vehicle. As an illustration, when the tractor alone is used, the headlamp beam may be adjusted to the required setting. When a semi-trailer is then attached to such a tractor, the latter in effect pivots about its rear axle resulting in projection of the headlamp beam to an undesired blinding and illegal extent. Furthermore, as the trailer is loaded this condition is further accentuated.

As a practical illustration of this undesirable situation, tests have been run on various types of tractors and semi-trailers to determine the degree in which headlamp aim is disrupted by the loaded and unloaded conditions, and where the tractor is detached from the trailer. In one type of tractor-trailer combination which was to be loaded with ten tons, the headlamp assembly was adjusted to a reference point. As a matter of fact, this reference point was selected as one in which there was no aim upwardly or downwardly from the horizontal when the tractor-trailer combination was loaded. Upon unloading the trailer, the headlamp beam was then down-aimed five inches. After the trailer was detached from the tractor, the down-aim increased to eleven inches.

In another manufacturer's truck having a trailer attached thereto, the vehicle was loaded with fifteen tons. The headlamps were aimed to the reference point. When the vehicle was unloaded, a two inch down-aim occurred, and when the trailer was detached this down-aim increased to a little more than four inches.

As aforementioned, all of the various States have regulations governing the maximum extent to which headlamp beams are to be aimed upwardly in a vertical plane. From the example cited above, it will be readily appreciated that the required setting will not always be obtained. Moreover, in the examples cited above, the headlamps were initially adjusted with the vehicle under load so that as the vehicles were unloaded only down-aim would occur. It will be readily appreciated that it often happens that the headlamps are initially adjusted on the tractor without the trailer or any other load being attached or imposed thereon. Thus, upon attaching the trailer and loading the latter, an extreme degree of upward aim occurs, which, of course, is very dangerous to the drivers of oncoming vehicles and a violation of the aforementioned regulations.

It is intended, therefore, within the scope of this invention to provide an aiming device for vehicles of the general class described in which the aim of the headlamp may be selectively adjusted to compensate for various loaded conditions of the vehicle. More particularly, it is intended to provide a headlamp assembly of the type aforementioned with a primary aiming means to initially aim the headlamp beam, and a secondary aiming means selectively operable to establish a desired degree of down-aim after the vehicle is loaded.

Moreover, within the scope of this invention, the aforementioned primary and secondary aiming means are so constructed and arranged that the secondary aiming means may be actuated irrespective of and without disturbing the setting of the primary aiming means whereby, at any desired time, the initially established headlamp aim may be obtained.

Referring now to the drawings:

Figure 1 is a front elevation of the headlamp assembly;

Figure 2 is a cross sectional view taken on line 2—2 of Fig. 1;

Figure 3 is an enlarged fragmentary front view of the aiming mechanism;

Figure 4 is an enlarged view of the aiming mechanism as shown in Fig. 2 with the headlamp initially aimed by the primary aiming means;

Figure 5 corresponds to Fig. 4 after the secondary aiming means has been operated to down-aim the headlamp; and Figure 6 is a perspective view of the aiming mechanism.

In the drawings, there is disclosed a ball and socket headlamp assembly comprising a ball or sub-assembly member 2 adapted to be universally adjustably mounted in a supporting housing 4 located within a vehicle fender. The supporting housing 4 includes an annular rolled rim 6 surrounded by a circumferentially rearwardly extending channel 8.

The ball member 2 includes a sealed beam headlamp unit 9 comprising the usual lens 10 and a lighting unit, not shown, fixedly secured relative to a reflector, also not shown. The design of the sealed beam unit 2 is such that the lighting unit is located in the desired position on the axis of the sealed beam unit relative to the reflector and optic design of the lens 10 to provide the desired beam patterns.

The ball member 2 further includes an annular retaining ring 12 having an inwardly turned lip 14 engaging an annular flange on the sealed beam unit. The sealed beam unit is seated in a mounting ring 16 having a plurality of spherical bearing surfaces 18 adjustably seated on the rolled rim or socket member 6 of the support housing 4. The sealed beam unit is effectively clamped between the retaining ring and mounting ring by means of a resilient spring 20 grounded within the annular channel 8 of the support housing and operatively connected in any suitable manner to the retaining ring 12. Moreover, a spring clip 22 is carried by the mounting ring and projects through a suitable aperture in the retaining ring 12 at a point preferably diametrically opposite from the spring 20.

The aiming means 24 and 26 are circumferentially spaced from the spring 20 and spring clip 22 and are preferably located, respectively, on the horizontal and vertical axes of the headlamp assembly.

Ordinarily, each aiming mechanism may include a bracket suitably located within the annular channel 8 of the support housing to support an aiming nut, and an aiming screw secured to a mounting ring flange is adjustably threadably mounted in the aiming nut. Thus, in the conventional structure described, the aiming screws may be selectively adjusted to universally adjust the ball member 2 within the support housing 4 at the points of bearing between the rolled rim 6 and mounting ring 16.

To provide a secondary aiming means which may be selectively actuated to provide a desired degree of down-aim upon loading of the vehicle, the aiming mechanism 26 located on the vertical axis of the assembly is modified as shown clearly in Figs. 2 through 6.

The aiming mechanism 26 located on the vertical axis of the assembly includes an aiming nut 28, preferably made of nylon, rigidly secured by any suitable means such as a bracket 30 to support housing 4. An adjustable aiming screw 32 is threadably mounted within the aiming nut 28 and, at its rearmost end 34, is fixedly secured by any suitable means to a bracket 36. A rotatable lever 38 is pivotally mounted to the bracket on a pin axis 40 extending transversely to the axis of the aiming screw 32. A spring 42 has one end engaged with the bracket 36, its intermediate portion wrapped about the pin 40 and its other end looped about the rear edge of the lever 38 to continuously urge the latter clockwise as viewed in Figs. 2, 4 and 5.

The lever 38 includes a slotted step portion 46 adjacent one end thereof, this end of the lever being adapted for movement in a suitably formed aperture 48 in a rearwardly extending flange 50 of the mounting ring 16. From Figs. 4 and 5, it will be readily apparent that one or the other steps on the lever 38 will selectively abut the mounting ring flange 50 depending upon the rotatable position of the lever, thereby forming a lost motion connection between ball member 2 and aiming screw 32. An operating lever 52 has an arm 54 at one end extending through an aperture 56 in the lever disposed vertically below the rotatable pivot 40 of the latter to the bracket 36. This lever extends forwardly and upwardly and then horizontally through an aperture in a guide member 58 welded or otherwise secured to the external surface of the retaining ring 12, and terminates in a handle 60 adjacent the sealed beam unit lens 10.

In operation, the headlamp beam is initially adjusted by means or rotation of the primary aiming mechanisms 24 and 26. In the case of the mechanism 26, reciprocation of the screw 32 rearwardly within its associated nut 28 moves the bracket 36 and lever 38 rearwardly or forwardly as the case may be. During this operation, the mounting ring flange 50 will be engaged in the lowermost step of the lever 38 (Fig. 4) so that the entire ball member 2 is adjusted to the desired amount in the vertical plane. Thereafter, upon the vehicle becoming unduly loaded to disrupt the desired aim by projecting the lamp beam upwardly, the lever 52 may be reciprocated rearwardly by pushing upon the handle 60 causing the lever 38 to rotate against the spring 42 until such time as the mounting ring and entire ball member 2 may pivot forwardly in the vertical plane under the influence of spring 20 until the mounting ring flange 50 engages the upper step (Fig. 5). Thereafter, the intial aim may be again acquired merely by pushing in on the ball member so that mounting ring flange 50 rides out of the upper slot permitting lever 38 to be spring biased to the Fig. 4 position.

It will be readily apparent that the extent of down-aim will be determined by the length of the upper step as shown in Fig. 5. Moreover, although but one down-aim step has been shown on the lever, it will be quite obvious that any desired number of steps may be incorporated to provide for different adjustments of lamp down-aim.

Having disclosed a preferred form of this invention which avoids the difficulties previously set forth, it is to be understood that it is to be limited only by the scope of the appended claims.

We claim:

1. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut, lost motion means connecting said ball member to said screw for movement therewith or independently thereof within predetermined limits, and secondary aiming means operatively connected to said ball member for movement thereof independently of said primary aiming screw to a predetermined fixed amount.

2. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut, secondary aiming means forming an operative connection between said primary aiming screw and ball member to fixedly locate the latter relative to the former in initially aiming said lighting unit, and means for operating said secondary aiming means to adjust lamp aim to a predetermined extent without disrupting the setting of said primary aiming screw.

3. In combination, an adjustable headlamp assembly of the type comprising a socket member and a ball member adjustably mounted therein, said ball member comprising a lighting unit sub-assembly including a lens, reflector and lighting filament fixedly mounted relative to said reflector; means yieldingly urging said ball member into engagement with said socket member, primary adjustable means including an adjustable lost motion connection between said ball member and socket member to permit aiming of the lighting unit, and means operatively connected to said lost motion connection to adjust the latter to adjust the aim of said lighting unit a predetermined fixed amount irrespective of the position of said primary adjustable means.

4. The combination of a lighting unit comprising a reflector, lens and light source fixed within and relative to the reflector, and a mounting therefor comprising a cup-shaped member extending about the reflector and having a spherical seating surface, a ring overlapping the front edge of the unit, means for securing said ring to the cup-shaped member and clamping said unit between them to form a sub-assembly, a support for the sub-assembly having an annular seat within which the spherical seating surface of the cup-shaped member is engaged to provide a universal joint, means yieldingly urging the sub-assembly into engagement with the support at one point, primary aiming means including a rotatably adjustable lost motion connection between the sub-assembly and the support at another point to permit aiming of the lighting unit, and means operatively connected to said lost motion connection to rotate the latter to adjust said sub-assembly a predetermined fixed amount irrespective of the position of said primary aiming means.

5. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, an aiming screw adjustably threadably connected to said nut, means connected to said aiming screw for movement therewith relative to said aiming nut and being operatively connectible at a plurality of points to said ball member, said connecting means being selectively adjustable to vary the connection thereof to said ball member, and operating means for adjusting said connecting means.

6. In combination, an adjustable headlamp assembly of the type comprising a supporting means including a socket member and a ball member adjustably mounted therein, said ball member comprising a lighting unit having a reflector, lens and light source fixed within the reflector, means yieldingly urging said ball member into engagement with the socket portion of said supporting means, means for adjusting the aim of the lighting unit of said ball member within said socket, said means comprising an internally threaded nut member fixedly mounted on said supporting means, a primary aiming screw adjustably threadably received within said nut, a rotatable lever carried by said screw for adjustment relative to said nut, a stepped slot formed in said lever and having a portion thereof normally operatively connected to said ball member, and operating means for rotating said lever whereby said ball member may tip for engagement with another portion of said stepped slot under the influence of said yieldable means.

7. In combination, an adjustable headlamp assembly of the type comprising a supporting means including a socket member and a ball member adjustably mounted therein, said ball member comprising a lighting unit having a reflector, lens and light source fixed within the reflector, means yieldingly urging said ball member into engagement with the socket portion of said supporting means, means for adjusting the aim of the lighting unit of said ball member within said socket, said means comprising an internally threaded nut member fixedly mounted on said supporting means, a primary aiming screw adjustably threadably received within said nut, a rotatable lever carried by said screw for adjustment relative to said nut, a stepped slot formed in said lever and having a portion thereof normally operatively connected to said ball member, and an operating arm connected to said lever for rotation of the latter whereby said ball member may tip for engagement with another portion of said stepped slot under the influence of said yieldable means, said arm extending forwardly of said primary aiming screw to a point adjacent said lens for external actuation.

8. The combination of a lighting unit comprising a reflector, lens and light source fixed within and relative to the reflector, and a mounting therefor comprising a cup-shaped member extending about the reflector and having a spherical seating surface, a ring overlapping the front edge of the unit, means for securing the ring to the cup-shaped member and clamping the unit between them to form a sub-assembly, a support for the sub-assembly having an annular seat within which the spherical seating surface of the cup-shaped member is engaged to provide a universal joint, spring means yieldingly urging the sub-assembly into engagement with the support at one point, primary aiming means connecting the sub-assembly and the support at another point to permit aiming of the lighting unit, and secondary aiming means operatively connected between said sub-assembly and support to adjust the position of the former a predetermined fixed amount irrespective of the position of said primary aiming means, said secondary means including a lever operatively rotatably mounted on said support, said lever including a stepped slot a portion of which is normally in engagement with said sub-assembly, and means connected to said lever and operable to rotate the latter whereby said sub-assembly tilts under the influence of said spring means until engaged with another portion of said stepped slot to adjust the aim of said lamp assembly.

References Cited in the file of this patent

UNITED STATES PATENTS

| | | |
|---|---|---|
| Re. 14,453 | MacDonald | Mar. 26, 1918 |
| 1,448,691 | Hunt | Mar. 13, 1923 |
| 2,605,388 | Theisen | July 29, 1952 |